Feb. 26, 1957          R. G. RUSSELL          2,782,563
METHOD AND MEANS FOR PRODUCING METAL-COATED GLASS FIBERS
Filed Nov. 23, 1953
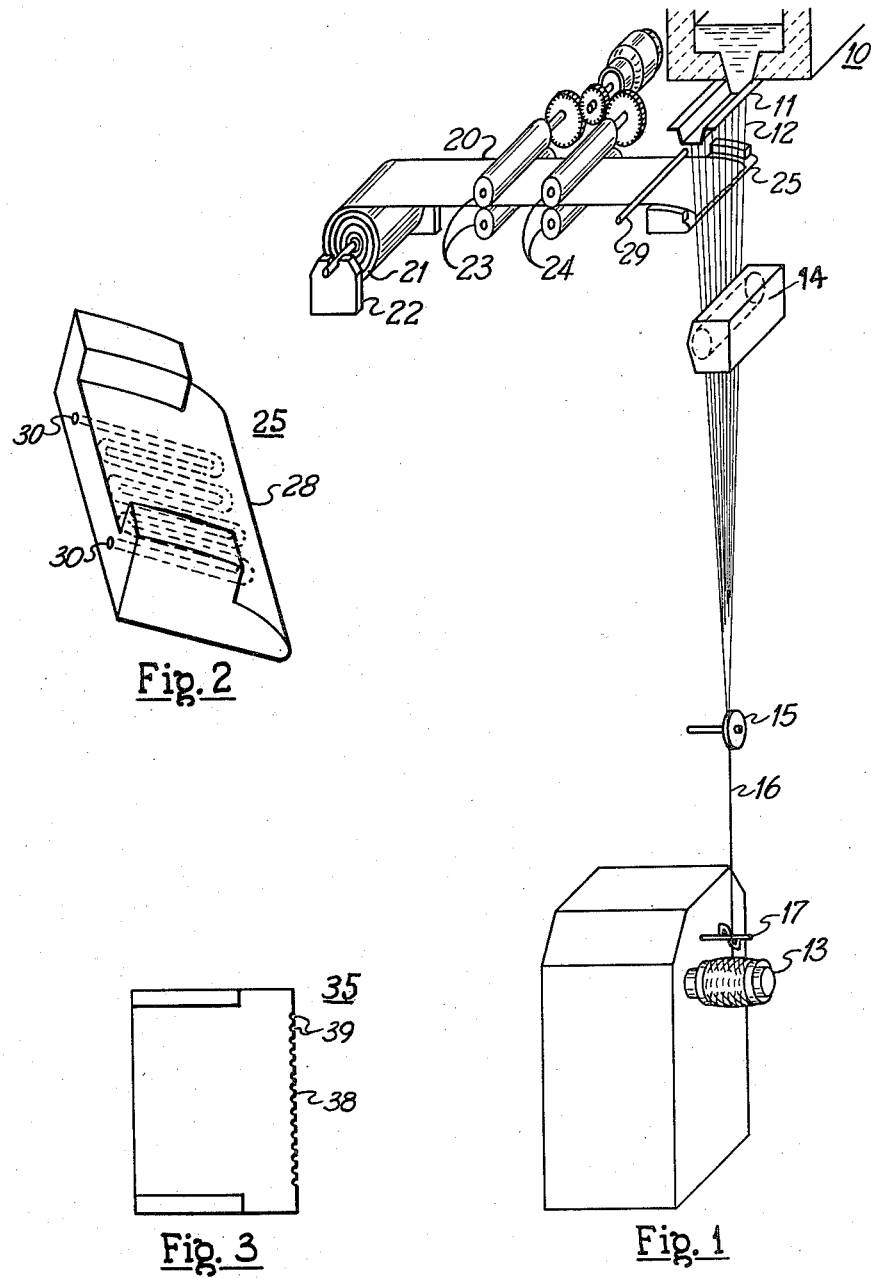
INVENTOR.
ROBERT G. RUSSELL
BY
ATTORNEYS United States Patent Office 2,782,563
Patented Feb. 26, 1957

2,782,563

METHOD AND MEANS FOR PRODUCING METAL-COATED GLASS FIBERS

Robert G. Russell, Granville, Ohio, assignor to Owens-Corning Fiberglas Corporation, a corporation of Delaware Application November 23, 1953, Serial No. 393,580

11 Claims. (Cl. 49—17)

This invention relates to glass fibers, particularly a method and means for producing metal coated glass fibers to increase their wear resistance and usable strength. More specifically, it relates to coating glass fibers with metals and metal alloys provided in sheet form.

The coating of glass fibers with metal, it has been found, is of tremendous value in increasing the usable strength of the fibers. It is well established that glass filaments have extremely high tensile strength, measurements having been made in which the rupture strengths exceeded one million pounds per square inch. Additionally, the flexing characteristics of individual fibers are also highly desirable since practically no yield takes place in such fibers. Glass fibers, however, have a weakness to surface abrasion which reduces their over-all ability to withstand movement in contact with each other or against other materials, thereby reducing the number of applications to which their otherwise high tensile and flex strengths might be desirably applied.

The coating of glass fibers with metal such as copper, zinc, aluminum, silver or alloys thereof, it has been found, successfully provides the protection of the glass surface against abrasion, thereby enhancing the use possibilities of the fibers in many instances to which they otherwise could not be adapted.

In view of the foregoing, it is an object of this invention to provide a new method and means for economically producing metal-coated glass fibers.

Another object of this invention is to provide a novel method and means for applying metal on glass fibers which are adaptable to production of such fibers at a high rate of speed in conventional fiber-forming processes.

Another object of the invention is to provide a method and means for applying metal to glass fibers during forming and which provide controls permitting establishment of desired temperature relations between the metal and the heated glass filaments at the point of application of the metal.

In brief, the principles of the invention entail coating glass fibers with metal by feeding metal such as aluminum, lead or tin in sheet or foil form into contact with the heated fibers as they are being formed. This concept resolves itself into two phases, one in which the heat of formation of the fibers is used to melt thin sheets or foils of metal being supplied thereto while according to the second, the metal supplied to the filaments is preheated and regulated in temperature to aid the heat of fiber formation to melt the metal and thereby also reduce the possibility of effects from undesirable chilling of the glass by the metal being fed.

The terminology "heat of formation" as used herein means the heat of the glass associated with the formation of glass fibers or the heat residing in the freshly formed fibers. The principles of the invention are herein disclosed by reference to an embodiment in which the sheet metal supplied to the fibers is preheated by conduction from electrically heated means. It will be recognized, however, that other heating means might be used. For instance, the sheet metal might be passed through a heated chamber or electrical current can be passed directly through the sheet. Induction heating or direct application of heat as from a flame can also be resorted to while in some instances preheating might be deemed unnecessary or undesirable. In referring to "sheet material" in the present description and following claims, it is to be understood that metals in "foil" form are also intended and that the terms might be used interchangeably without deviating from the concepts of the invention.

A feature of the invention is the rapidity with which the desired temperature can be imparted to the metal, thus making the method and means flexibly adaptable to providing the physical properties controllable by selection of particular temperature relations between the metal and glass fibers.

Still another feature of the invention lies in its adaptability to providing different thicknesses of metal on the glass fibers.

Other objects and features which I believe to be characteristic of my invention are set forth with particularity in the appended claims. My invention, however, both in organization and manner of construction together with further objects and advantages thereof may be best understood by reference to the following description taken in connection with the accompanying drawing in which:

Figure 1 is a somewhat schematic view in perspective of apparatus for forming metal-coated glass fibers in accordance with the principles of the present invention;

Figure 2 is an enlarged perspective view of the applicating shoe shown in Figure 1; and Figure 3 is a plan view of a modified form of part of the apparatus in Figure 1 illustrating another form of shoe by which sheet metal may be fed to glass fibers during forming.

Turning to the drawing in detail, Figure 1 shows a general layout of apparatus for producing metal-coated fibers, including a suitable glass melting tank 10 having a feeder 11 provided with a series of outlets in its bottom from which flow a plurality of streams 12 of molten glass. The outlets are preferably arranged in one or two rows so that the streams are all substantially in the same plane. As the streams flow from the outlets they are drawn out into fibers or filaments by means of a rotating drum or collet-supported collecting tube 13 which winds the fibers thereon in strand form and also supplies the force of pulling the filaments to draw out the streams 12. A gathering member 15 for collection of the filaments into a group or strand 16 is provided in a position intermediate the source of the streams 12 and the collecting tube 13. The member 15 as shown is a spinner made of material such as graphite, or a plastic such as tetrafluoroethylene and the like.

Sizing materials may be applied to the filaments as they are gathered into the strand at the gathering member 15 or they may be applied separately such as from a roll applicator 14 located at a suitable level of application above the gathering member. Sizings such as those set out in United States Patent 2,234,986 issued on March 18, 1941 may be applied or material which is more lubricant in nature such as petroleum oil, vegetable oil, molybdenum disulfide or other metal lubricants.

Traversal of the strand to form a package during winding may be effected by suitable traversing means such as a spiral-wire traverse 17 arranged to sweep the strand back and forth across the collection tube with each revolution.

The described apparatus for forming the glass fibers is preferred over other fiber-forming and collecting means because the fibers can be formed at extremely high rates of speeds thereby promoting and enabling manufacture at extremely economical values. The metal 20 is applied to the fibers at a point intermediate the outlets from the feeder 11 and the gathering member 15 and is supplied in foil or sheet form 20 substantially equal or slightly greater in width than the width of the fan of fibers at the point of application. The sheet is withdrawn from a roll 21 mounted in a support structure 22 located for convenient withdrawal by two sets of feed rolls 23 and 24.

The average temperature of molten glass in the manufacture of most glasses used in textile fibers is in the order of 2300° F. At points a considerable distance below the feeder outlets, this temperature drops to that of the surrounding atmosphere. By reason of the fact that the drop in temperature of the filaments extends over a considerable distance of the fan of fibers, a range of temperature levels exists for selection of the proper temperature for application of specific metals which in many instances predetermines the physical properties of the combination of glass and metal. The relationship of the temperature of the metal to that of the glass at the point of application proves important since the strength of the glass fibers may be impaired by metal temperatures of too high a value. That is, the level at which the sheet metal is applied to the fibers is in practice selected by the properties desired in the final product and is accomplished by raising and lowering the feeding rools and shoe applicator to introduce the sheet at the points on the fibers where the desired temperature is existent.

The feed rolls 23 and 24 are driven by a vari-speed electrical motor through a gear train. The primary tension of removal of the sheet from the roll 21 is effected by the rear set of rolls 23, while the front set of rolls 24 act primarily to guide and progressively feed the sheet over the face of a shoe-type applicator 25. The rolls are made of suitable material such as neoprene or silicone rubber capable of operating at elevated temperatures under sufficient pressure to establish positive frictional engagement with the sheet and thereby assure a positive uniform passage of metal over the shoe 25.

The shoe 25, as shown in Figure 2, is provided with laterally disposed surface projections which also act to guide movement of the sheet or flow of molten metal downwardly in the direction desired if the material fluidity is reached before contact with the filaments. The shoe is provided with a pair of electrical terminals connected to a heating unit embedded therein which allows control of the shoe temperature to promote preheating of the sheet metal as it makes contact therewith and which is capable of raising the temperature sufficiently to assure melting of specific metals at the applicating edge 28 of the shoe 25. A water cooled tube 29 is adjustably disposed adjacent the upper roll of the forward set of rolls 24 and extending parallel to it across the width of the sheet near the point of introduction of the metal to the shoe 25. The cooling tube acts to prevent the conduction of heat from the shoe as well as from the filaments back along the length of the metal sheet 20 which might otherwise prematurely heat metal at points behind the shoe.

In operation, the speed of the feed rolls is made such as to supply sufficient metal at the leading edge 28 of the shoe to fully coat the individual filaments drawn thereover in engagement therewith. The applicating shoe 25 is angularly disposed with regard to the filaments to assure a gravity flow of molten metal to the leading edge. Angular disposition of the shoe also has the feature that heat from the filaments and streams 12, as well as the bushing 11 and forming cones, is transmitted by radiation directly to the sheet surface to promote preheating of the metal as it passes over the shoe. Such preheating, of course, is progressively intensified as the metal approaches more closely to the point of application of the filaments. In addition to the inherent preheating provided by the arrangement, the heater unit incorporated within the applicator shoe itself is utilized to permit more exact control of the metal temperatures at the point of application on the leading edge 28. In this respect, it should be noted that the water cooled tube 29 additionally provides control in the event that rapid cooling is desired such as by supply of water at a more rapid rate when the rate of introduction of metal to the filaments is greatly reduced.

In usual operation, the sheet metal is preheated in the shoe 25 to a temperature just below a state of fluidity. Since metals have a sharp or narrow temperature range within which they change from a solid to a fluid state, thermal conditions can be established in the progressively forward moving sheet so that only the heat residing in the filaments is required to completely melt the metal at the points of contact with the filaments. Thus, on contact, molten metal is formed which envelops the filaments at the leading edge 28 to produce the coatings desired. In certain instances, it may be found desirable to preheat the sheet 20 on the shoe sufficiently to melt it before contact with the filaments. Under these conditions the metal upon melting flows downwardly to the leading edge 28 where an accumulation is formed through which the filaments are drawn for the desired coating of each.

Figure 2 is an enlarged perspective view of the shoe 25 showing more clearly that the leading edge 28 is rounded. Conductors leading to the terminals 30 located to the rear of the shoe provide the means for connection to the heating unit embedded within the shoe.

Figure 3 is an illustration of another form of shoe 35 similar to that shown in Figures 1 and 2, except that grooves are provided at the leading edge 38 through which the filaments of glass may be drawn for application of a coat of metal therein. Grooves 39 serve to act as retaining cavities or pockets for suspension of molten metal by its own surface tension as it is melted, and also serves as means whereby the filaments may be drawn through the metal so as to fully surround the filaments to be coated. Additionally, the grooves can be used to guide the filaments in their passage to the gathering and winding equipment.

Although as indicated previously, specific methods of heating the sheet metal are illustrated, it will be recognized that still other means are possible within the concepts of the invention. For example, the heating might be effected by passage of electrical current through the sheet portion between the two feed rolls 23 and 24, or by application of voltages of opposite potential to the upper and lower rolls of the set 24. Additionally, electrical induction means may be used to preheat the sheet for any length before or following introduction to the applicator shoe. Supply rolls might also be associated directly with the applicating shoe between which voltages might be established for heating of the sheet.

It will also be recognized that sheets of metal can be fed simultaneously from opposite sides of the filaments, if desired. Additionally, different metals may correspondingly be fed simultaneously from opposite sides of the filaments to be alloyed thereon. For instance, a low-melting eutectic type alloy may thus be coated on the filaments.

In view of the foregoing, it will be understood that while I have shown certain particular forms of my invention, I do not wish to be limited thereto since many modifications may be made within the concept of the invention and I, therefore, contemplate by the appended claims to cover all modifications which fall within the true spirit and scope of my invention.

I claim:

1. A continuous method for metal-coating glass filaments during forming comprising progressively feeding metal in thin sheet form so that an edge thereof makes contact with the filaments at points where the residual heat remaining in the filaments after their formation is such as to melt the edge of the metal and cause it to envelop the filaments to provide a coating therefor.

2. The method of metal coating glass filaments during forming comprising progressively feeding metal in the form of a thin sheet so that its leading edge is brought into proximity with filaments to be coated, preheating the sheet portion adjacent the edge, raising the edge of the metal in temperature to a molten condition by contact with the heated filaments, whereby the melted metal envelops the filaments to provide the coating desired.

3. The method of metal coating glass filaments during forming comprising progressively feeding a thin sheet of metal into proximity with filaments to be coated, preheating the sheet metal to a temperature immediately below melting temperature, then raising the metal still further in temperature to its molten condition by heat of said filaments retained following their formation, and enveloping the filaments with the molten metal to provide the coatings therefor.

4. The method of producing metal-coated glass filaments comprising flowing streams of glass from a source of molten glass, attenuating said streams into filaments, progressively feeding a thin sheet of metal toward said filaments to effect a melting of the metal by heat of said filaments retained following formation, and so passing the filaments for individual envelopment by the metal to provide metal coatings for the filaments.

5. The method of producing metal-coated glass filaments comprising flowing streams of glass from a source of molten glass, attenuating said streams into filaments, progressively feeding a thin sheet of metal toward said filaments, passing said sheet over a hot surface to effect a preheating thereof upon approach to said filaments, melting the metal of said heated sheet with heat of said filaments retained following their formation, and moving the filaments in proximity to the edge of said sheet for individual envelopment by the metal to provide metal coatings for the filaments.

6. The method of producing metal-coated glass filaments comprising flowing streams of glass from a source of molten glass, attenuating said streams into filaments, progressively feeding a thin sheet of metal toward said filaments to effect a melting of the metal by heat of said filaments retained following their formation, passing said sheet to said filaments in a path effective to establish points of envelopment of the individual filaments in a zone where the relative temperatures of glass and molten metal are such that the metal will adhere to the glass upon solidification.

7. The method of producing metal-coated glass filaments comprising flowing streams of glass from a source of molten glass, attenuating said streams into filaments, progressively feeding a sheet of metal toward said filaments in a zone where the filaments are still hot, passing said sheet over a heated surface for progressive elevation of its temperature to a valve such that the leading edge of the metal reaches a molten condition upon addition thereto of heat from said filaments, flowing said molten metal over said surface to said filaments to effect a coating thereof.

8. The method of producing metal-coated glass filaments comprising flowing streams of glass from a source of molten glass, attenuating said streams into filaments, progressively feeding a thin sheet of metal toward said filaments to effect a melting of the metal by heat retained by said filaments following their formation, moving the filaments past the edge of said sheet for individual envelopment by the molten metal to provide coatings therefor, and controlling the rate of feed of the metal with respect to the rate of movement of the filaments to provide coatings of predetermined thickness on the filaments.

9. Apparatus for producing metal-coated glass filaments comprising means for providing streams of molten glass, means for attenuating said streams into filaments, an applicator for preheating and melting metal in sheet form for application to said glass filaments, means for feeding sheet metal over said applicator, said applicator comprising a planar-surface member constructed of high temperature resistant, heat-conducting material to permit heat-softening of the metal thereon, means for heating said member, said planar-surface member being located adjacent said filaments in a zone where the filaments are sufficiently hot with heat retained following formation that some retained heat will be transmitted to metal on said member, said planar member also being inclined to said filaments to promote movement of said metal toward said filaments to effect a coating thereof.

10. Apparatus for producing metal-coated glass filaments comprising means providing streams of molten glass, means for attenuating said streams into filaments, applicator means for preheating and melting metal in sheet form for application to said glass filaments, said applicator means having a coating edge past which said filaments are drawn, means for heating said member, said member being located adjacent said filaments in a zone where the filaments are still hot with heat retained from formation, said member also being inclined to said filaments so that heat of said filaments is received at the surface of said member, and so that molten metal formed thereon when a sheet of metal is fed over said surface is caused to flow to said coating edge, said member having filament-guide grooves at said coating edge through which said filaments are drawn, said grooves being sufficiently narrow that metal accumulated therein will be retained and suspended therein by surface forces of the metal, said grooves also being sufficiently deep that filaments drawn therethrough are enveloped by the accumulation of molten metal within the grooves to provide coatings therefor.

11. The method of producing metal-coated glass filaments comprising flowing streams of glass from a source of molten glass, attenuating said streams into filaments, progressively feeding a thin sheet of metal toward said filaments over a heated surface toward said filaments for elevation of its temperature by the heat of said surface as well as by the heat retained by the glass of said filaments following attenuation to cause the edge of the sheet to become molten, and moving the fibers in a path such that they are enveloped by the molten metal of the edge of the sheet to effect the metal coating thereof.

References Cited in the file of this patent

UNITED STATES PATENTS

| | | |
|---|---|---|
| 2,323,684 | Simison | July 6, 1943 |
| 2,373,078 | Kleist | Apr. 3, 1945 |
| 2,616,165 | Brennan | Nov. 4, 1952 |

FOREIGN PATENTS

| | | |
|---|---|---|
| 849,842 | France | Aug. 28, 1939 |